No. 740,048. PATENTED SEPT. 29, 1903.
C. C. SCHMAND.
VEHICLE RUNNING GEAR AND BRAKE.
APPLICATION FILED MAR. 30, 1903.
NO MODEL. 2 SHEETS—SHEET 1.
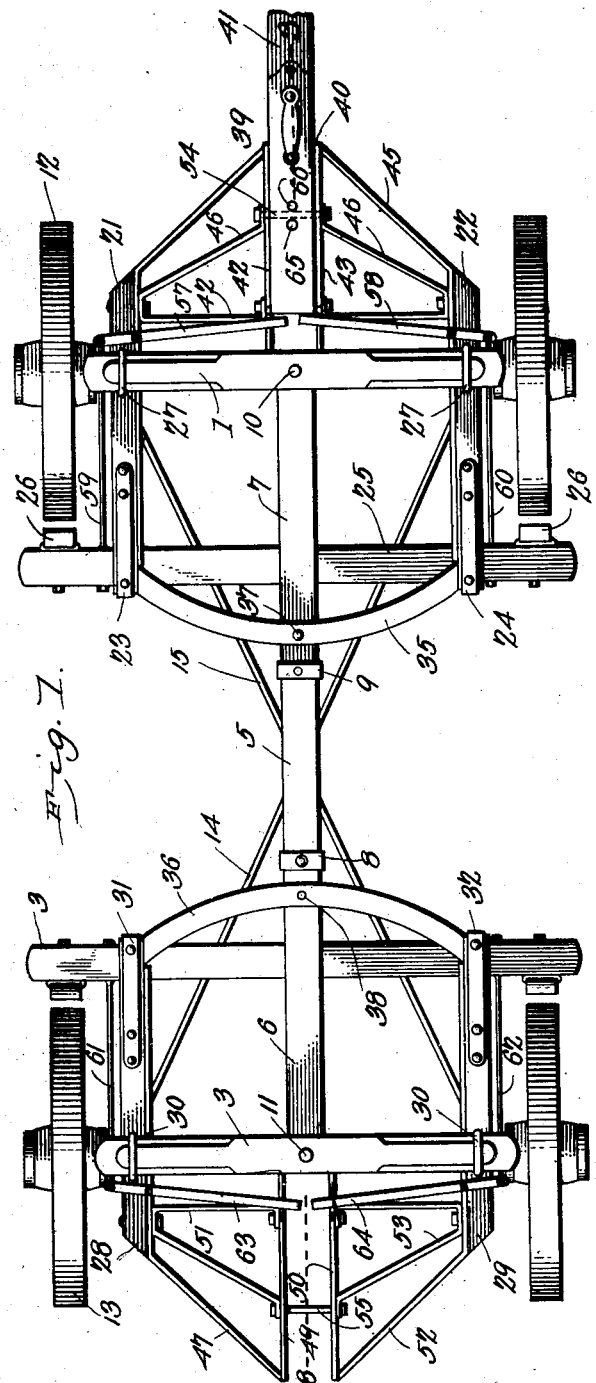
Witnesses
C. C. Schmand, Inventor
by C. A. Snow & Co.
Attorneys No. 740,048. PATENTED SEPT. 29, 1903.
C. C. SCHMAND.
VEHICLE RUNNING GEAR AND BRAKE.
APPLICATION FILED MAR. 30, 1903.
NO MODEL. 2 SHEETS—SHEET 2.
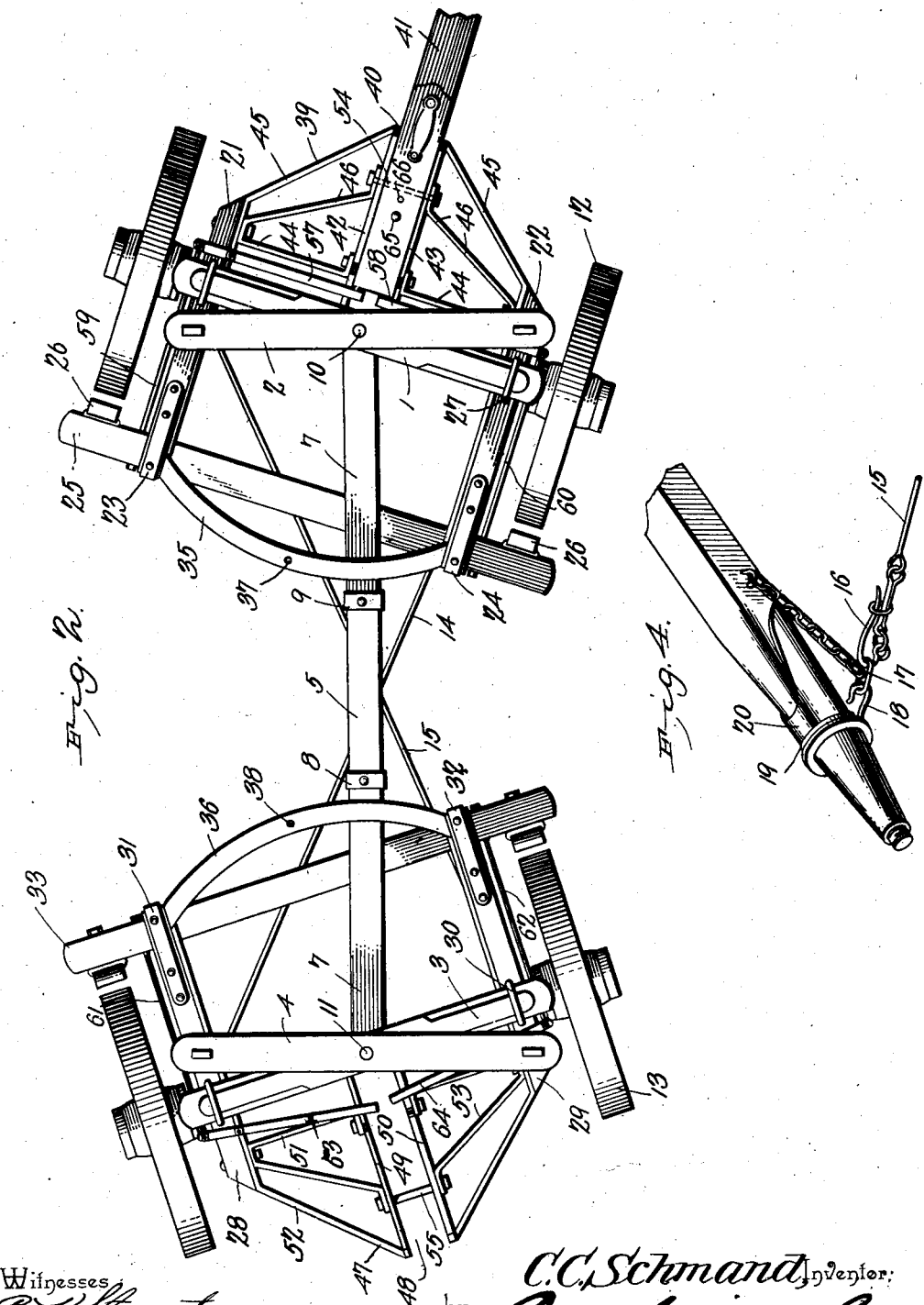

No. 740,048. Patented September 29, 1903.

UNITED STATES PATENT OFFICE.

CHARLES C. SCHMAND, OF WINLOCK, WASHINGTON.

VEHICLE RUNNING-GEAR AND BRAKE.

SPECIFICATION forming part of Letters Patent No. 740,048, dated September 29, 1903.

Application filed March 30, 1903. Serial No. 150,267. (No model.)

*To all whom it may concern:*

Be it known that I, CHARLES C. SCHMAND, a citizen of the United States, residing at Winlock, in the county of Lewis and State of Washington, have invented a new and useful Vehicle Running-Gear and Brake, of which the following is a specification.

My invention relates to a combined running-gear and automatic brake for vehicles, and has for its objects to produce a device of this character in which the front and rear axles will move simultaneously during the turning of the vehicle for properly tracking the wheels in order that obstructions within the radius of the turn will be avoided by all of the wheels, one in which the draft-tongue may be interchanged from one end of the vehicle to the other to expedite movements of the latter in places where it is impracticable to turn the vehicle, and one in which back draft on the tongue will act to automatically operate the brake, and to provide a simple and comparatively inexpensive construction by which these various ends are attained.

To these ends the invention comprises the novel details of construction and combination of parts more fully hereinafter described and claimed.

In the accompanying drawings, Figure 1 is a top plan view of a vehicle running-gear constructed in accordance with my invention. Fig. 2 is a similar view of the same, illustrating the relative position of the parts during the turning of the vehicle. Fig. 3 is a central vertical longitudinal sectional elevation on the line 3 3 of Fig. 1. Fig. 4 is a detailed view of the means for attaching the connecting-rods to the axles.

Referring to the drawings, 1 indicates the normally front axle, 2 its bolster, 3 the rear axle, 4 its bolster, and 5 the reach-beam, of my improved running-gear. The reach comprises two parallel sections 6 and 7, which overlap one above the other and are slidingly connected for longitudinal adjustment by means of collars 8 9, which are secured to the ends of the respective sections and loosely enclasp the body portion of the adjacent sections. The front and rear axles are pivoted, respectively, by bolts 10 11 to the opposite ends of the reach-beam and are adapted during the turning of the vehicle to swing freely on their pivots in a horizontal plane, as illustrated in Fig. 2. In order, however, that the axles may swing uniformly to insure their respective wheels 12 13 properly tracking, they are connected one with the other by a pair of crossed diagonally-disposed connecting-rods 14 15, which are connected to the ends of the axles each by means of a hook 16, which engages a link of a short chain 17, attached to a hook 18, projecting from a collar 19, which encircles the wheel-spindle 20. Thus it will be seen that the axles will swing uniformly for the purpose above explained when the axles are connected by the rods and that the latter may be readily disconnected for the purpose which will hereinafter appear.

21 22 indicate a pair of horizontal bars which are attached to the opposite ends of the axle 1 and project forwardly of the same a short distance and extend rearwardly therefrom and have attached to them, respectively, metal straps 23 24, which are centrally bent into U shape in longitudinal section to form horizontal slots which receive a brake-beam 25, provided with suitable brake-shoes 26. The bars 21 22 are attached to the axle in any suitable manner, but preferably by U-shaped clips 27, which embrace the axle and extend through perforations in the bars and have confining-nuts tapped onto their ends. The metal straps 23 24 are bolted or otherwise secured to the outer ends of the respective bars, and the brake-beam 25 is adapted for sliding movement in a direction longitudinally of the bars for moving the brake-shoes into and out of braking position.

28 29 indicate a pair of bars similar to the bars 21 22, which are secured by U-shaped clips 30 to the opposite ends of axle 3 and project rearwardly of the same a short distance and extend forwardly of the same and are provided with U-shaped straps 31 32, which form slots for the reception of a brake-beam 33, provided with brake-shoes 34, which act upon the wheels 13 for braking the same. These parts are all identical in construction, operation, and mode of assemblage with those above described in connection with the front axle. Hence further detailed description of the same is deemed unnecessary.

35 indicates a half-circle, in the form of a metal plate, which is secured at its respective ends to the bars 21 22, and 36 is a similar plate carried by the bars 28 29. These half-circles, which constitute, in effect, fifth-wheels for the respective axles, ride upon the upper face of the reach-beam 5 and are provided, respectively, with central vertical perforations 37 38, through which and the reach-beam suitable bolts may be inserted for locking either of the axles against movement when desired and as more fully hereinafter explained.

39 indicates a frame which is bolted to the outwardly-extending portion of the bars 21 22 and has a central socket 40, which receives the inner end of a tongue or pole 41. This frame comprises spaced plates 42 43, which when the pole is in position will lie upon opposite sides thereof and which are sustained by inner end braces 44, outer end braces 45, and intermediate braces 46, all bolted, respectively, to the side plates and to the extended portions of the bars 21 22. A similar frame 47 is bolted to the outer extended portions of bars 29 28 and is provided with a tongue-receiving socket 48, formed by spaced parallel plates 49 50, sustained by inner end braces 51, outer end braces 52, and intermediate braces 53, all bolted, respectively, to the plates and to the extended portions of the bars 28 29 in a manner similar to that just described in connection with the frame 39.

54 indicates a horizontal bolt which extends transversely of the tongue-receiving socket 40, and 55 a similar bolt which extends transversely of the tongue-receiving socket 48. These bolts are tapped through the respective side plates 42 43 and 49 50 and serve as a guide for the tongue 41 when the end of the latter is inserted in the respective sockets. The tongue is horizontally slotted, as at 56, and is adapted for longitudinal movement to automatically apply the brake under the influence of back draft of the animals, and when the animals pull backward the rear end of the tongue will bear upon and force inward a pair of brake-levers 57 58, which are pivoted at their outer ends to the forwardly-extended portion of the respective bars 21 22 and are connected by links 59 60 with the brake-beam 25. The brake-beam 33 is similarly connected by a pair of links 61 62 with brake-levers 63 64, identical in construction and operation with those just described. When the tongue is moved inward, owing to the animals holding back upon downgrade, the brake-levers will, as above stated, be forced inward, which action will, through the medium of the connecting-links, draw the brake-beam forward and press the brake-shoes firmly against the wheel, as will be readily understood. The tongue may, however, be locked against longitudinal movement to permit the animals to pull forward or back, without in any manner affecting the brake, by means of vertical bolts 65 66, inserted through the tongue at opposite sides of the horizontal bolt 54. In this connection it will be readily understood that when it is desired to have the pole operate the brake the bolt 66 will be removed. The plates 42 43 and 49 50 are double-sector shaped in side elevation, as illustrated in Fig. 3, to form vertical guides for the end of the pole during the swinging of the same in a vertical plane.

In practice during the travel of the vehicle the axles will swing uniformly, owing to their being connected by the rods 14 15, and when so connected they will of course remain free to swing upon their respective pivots. When, however, it is desired to lock either of the axles against swinging movement, the rods are disconnected by disengaging hooks 16 from links 17 and a vertical locking-pin is inserted through perforation 37 or 38, as the case may be, and the reach-beam, which latter is longitudinally adjustable for varying the length of reach between the axles. When both axles are unlocked, the vehicle will turn freely and the wheels will track one behind the other to avoid obstructions, as above stated. Further, the pole may be readily changed from one end of the vehicle to the other to obviate the necessity of turning when such action is impracticable, and the pole will at either end of the vehicle serve to brake the same by operating upon the respective brake-levers in the manner above explained.

When the reach-beam is extended longitudinally, the connecting-rods may be similarly adjusted by engaging the proper link of chain 17 with the hook 18, as will be readily understood.

From the foregoing it will be seen that I produce a simple and efficient device which in practice will meet the various contingencies which may arise during the operation of the same, and in attaining these ends it is to be understood that I do not limit myself to the precise details herein shown and described, inasmuch as minor changes may be made therein without departing from the spirit of my invention.

Having thus described my invention, what I claim is—

1. In a device of the class described, the combination with an axle and wheels, of a pair of horizontal bars carried by the axle and provided with slots, a brake-beam mounted in the slots, a tongue-supporting frame sustained by the bars and comprising a pair of parallel plates spaced to form a socket and braces attached to the plates and the horizontal bars, a pair of brake-levers pivoted to said bars and having their inner ends wholly free and extending within the plane of the socket, a longitudinally-movable tongue mounted in the socket between the plates and provided with a slot, and a bolt extending through said slot and engaged with the plates, said tongue being operable by back draft for actuating the levers to apply the brake.

2. In a device of the class described, the combination with an axle and wheels, of a pair of horizontal bars carried by the axle and provided with slots, a brake-beam mounted in the slots, a tongue-supporting frame sustained by the bars and comprising a pair of vertically-disposed parallel sector-shaped plates spaced to form a socket and braces attached to the plates and the horizontal bars, a pair of brake-levers pivoted to said bars and having their inner ends wholly free and extending within the plane of the socket, a longitudinally-movable tongue mounted in the socket between the plates and provided with a slot, and a bolt extending through the slot and engaged with the plates, said tongue being operable by back draft for actuating the levers to apply the brake.

In testimony that I claim the foregoing as my own I have hereto affixed my signature in the presence of two witnesses.

CHARLES C. SCHMAND.

Witnesses:
HARRY F. WARNE,
J. V. WARNE.